(12) United States Patent
Tae et al.

(10) Patent No.: US 10,056,064 B2
(45) Date of Patent: Aug. 21, 2018

(54) ELECTRONIC APPARATUS AND CONTROL METHOD THEREOF AND AUDIO OUTPUT SYSTEM

(71) Applicant: SAMSUNG ELECTRONICS CO., LTD., Suwon-si (KR)

(72) Inventors: Kyung-hyun Tae, Seoul (KR); Bum-gie Kim, Suwon-si (KR); Byung-soo Kim, Seoul (KR); Young-jo Seo, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/959,055

(22) Filed: Dec. 4, 2015

(65) Prior Publication Data
US 2016/0163306 A1    Jun. 9, 2016

(30) Foreign Application Priority Data
Dec. 5, 2014 (KR) .......................... 10-2014-0174097

(51) Int. Cl.
*G10K 11/178* (2006.01)
*G06F 3/16* (2006.01)
(Continued)

(52) U.S. Cl.
CPC ............ *G10K 11/178* (2013.01); *G06F 3/165* (2013.01); *H04R 3/12* (2013.01); *H04S 3/00* (2013.01);
(Continued)

(58) Field of Classification Search
CPC ............ G10K 11/178; G10K 11/1782; G10K 11/1784; G10K 11/1786;
(Continued)

(56) References Cited

U.S. PATENT DOCUMENTS 6,934,396 B1 * 8/2005 Leapman ................. H04R 5/04
                                                            381/58
7,190,796 B1    3/2007 Kashani
(Continued)

FOREIGN PATENT DOCUMENTS

| CN | 101176382 A | 5/2008 |
| CN | 101800926 A | 8/2010 |

(Continued)

OTHER PUBLICATIONS

International Search Report for PCT/KR2015/007619 dated Nov. 23, 2015 [PCT/ISA/210].
(Continued)

*Primary Examiner* — Jason R Kurr
(74) *Attorney, Agent, or Firm* — Sughrue Mion, PLLC

(57) ABSTRACT

One or more exemplary embodiments provide an electronic apparatus and control method thereof and an audio output system, the method including receiving a noise signal at a first audio output apparatus of a plurality of audio output apparatuses from the at least one first audio output apparatus; generating a noise removing signal based on the noise signal; and providing the noise removing signal to the at least one first audio output apparatus, and providing an audio signal to a second audio output apparatus of the plurality of audio output apparatuses.

21 Claims, 16 Drawing Sheets

(51) Int. Cl.
  *H04R 3/12* (2006.01)
  *H04S 3/00* (2006.01)
(52) U.S. Cl.
  CPC .............. *G10K 2210/1053* (2013.01); *G10K 2210/3023* (2013.01); *G10K 2210/3028* (2013.01)
(58) Field of Classification Search
  CPC ... G10K 2210/1053; G10K 2210/3023; G10K 2210/3011; G10K 2210/3028; G10K 2210/3025; H04R 3/002; H04R 3/12; H03G 3/32; H03G 5/18; G06F 3/165; H04S 3/00
  USPC ...... 381/71.1, 71.2, 71.4, 71.8, 71.11, 71.12, 381/71.14
  See application file for complete search history.

(56) References Cited

U.S. PATENT DOCUMENTS

| | | | |
|---|---|---|---|
| 8,126,159 B2* | 2/2012 | Goose | H04S 3/002 381/302 |
| 8,687,090 B2 | 4/2014 | Han | |
| 9,020,158 B2 | 4/2015 | Wertz et al. | |
| 2006/0262935 A1 | 11/2006 | Goose et al. | |
| 2007/0076896 A1* | 4/2007 | Hosaka | G10K 11/1788 381/71.11 |
| 2010/0124337 A1 | 5/2010 | Wertz et al. | |
| 2010/0131269 A1 | 5/2010 | Park et al. | |
| 2010/0183156 A1 | 7/2010 | Park et al. | |
| 2010/0290635 A1* | 11/2010 | Shridhar | G10K 11/1786 381/71.1 |
| 2012/0069242 A1 | 3/2012 | Pearlstein | |
| 2012/0127341 A1 | 5/2012 | Han | |
| 2012/0300955 A1 | 11/2012 | Iseki et al. | |
| 2016/0073197 A1* | 3/2016 | Hammer | H04W 12/04 381/80 |

FOREIGN PATENT DOCUMENTS

| | | |
|---|---|---|
| CN | 101877808 A | 11/2010 |
| CN | 102572236 A | 7/2012 |
| EP | 2209327 A1 | 7/2010 |
| GB | 2360900 B | 1/2004 |

OTHER PUBLICATIONS

Written Opinion for PCT/KR2015/007619 dated Nov. 23, 2015 [PCT/ISA/237].

Communication dated May 6, 2016, issued by the European Patent Office in counterpart European Application No. 15195383.3.

Communication dated Apr. 25, 2017 issued by the European Patent Office in counterpart European Patent Application No. 15195383.3.

Communication dated Feb. 27, 2018, from the State Intellectual Property Office of People's Republic of China in counterpart Application No. 201510802314.8.

Communication dated Apr. 3, 2018, from the European Patent Office in counterpart European Application No. 15195383.3.

* cited by examiner

ELECTRONIC APPARATUS AND CONTROL METHOD THEREOF AND AUDIO OUTPUT SYSTEM

CROSS-REFERENCE TO RELATED APPLICATION

This application claims priority from Korean Patent Application No. 10-2014-0174097 filed in the Korean Intellectual Property Office on Dec. 5, 2014, the disclosure of which is incorporated herein by reference in its entirety.

BACKGROUND

1. Field

Methods and apparatuses consistent with exemplary embodiments relate to an electronic apparatus that is capable of removing noise, a control method, and an audio output system thereof.

2. Description of Related Art

Generally, when an audio signal per channel is input into a plurality of audio output apparatuses of an audio output system such as a multi-channel home theater system, each of the audio signal input is converted into an outputtable format and is output.

However, when noise occurs due to the presence of a plurality of audio output apparatuses, a noise signal may be mixed with an audio signal being output through the plurality of audio output apparatuses, and thus the quality of the audio may diminish.

In order to improve this problem, a conventional audio output system may receive a noise signal generated due to an external environmental element from the plurality of audio output apparatuses, and generate a noise removing signal for attenuating noise from each noise signal input. Then, the audio output system includes the noise removing signal generated per each audio output apparatus for each audio signal to be output to the plurality of audio output apparatuses, and transmits the same.

Accordingly, the plurality of audio output apparatuses output an audio signal that includes the audio signal per channel of each audio output apparatus and the noise removing signal.

However, a problem with this related art noise removing method is that the audio might not be high quality because distortion may occur in the audio output, due to the noise removing signal that is included in the audio signal per audio output apparatus.

SUMMARY

Therefore, a purpose of one or more exemplary embodiments is to resolve the aforementioned problems, that is, to enable audio of high quality to be output from an audio output apparatus.

Furthermore, the purpose of one or more exemplary embodiments is to enable an operating mode of an audio output apparatus to output a noise removing signal and an audio output apparatus to output an audio signal of a plurality of audio output apparatuses to be set up more intuitively.

According to an aspect of an exemplary embodiment, there is provided a control method of an electronic apparatus, the method including receiving a noise signal from a first audio output apparatus from among a plurality of audio output apparatuses; generating a noise removing signal based on the received noise signal; and providing the noise removing signal to the first audio output apparatus, and providing a first audio signal to a second audio output apparatus from among the plurality of audio output apparatuses.

The method may further include storing the noise removing signal that is generated based on the received noise signal, wherein the providing the noise removing signal may include, in response to an audio reproduce command being received, providing a pre-stored noise removing signal to the first audio output apparatus and providing the first audio signal to the second audio output apparatus.

The method may further include, in response to the first audio signal being provided to the second audio output apparatus, storing the first audio signal in a storage; and in response to sound source data including the noise signal being received from the first audio output apparatus, extracting the noise signal from the sound source data based on the stored first audio signal, wherein the storing the noise removing signal further may include updating the noise removing signal such that the noise removing signal is generated based on the noise signal extracted from the sound source data, and storing the updated noise removing signal.

The method may further include determining whether a frequency band of the noise signal extracted from the sound source data and a frequency band of a previously stored noise signal are within a predetermined range of each other, wherein the storing the noise removing signal may further include, in response to the frequency bands being outside of the predetermined range, updating the noise removing signal such that the noise removing signal is generated based on the noise signal extracted from the sound source data, and storing the updated noise removing signal.

The method may further include, in response to receiving an audio set up command, setting up an audio output apparatus from among the plurality of audio output apparatuses to output the noise removing signal and setting up another audio output apparatus from among the plurality of audio output apparatuses to output an audio signal, according to the received audio set up command.

The setting up each of the plurality of audio output apparatus may include providing a test signal to an audio output apparatus from among the plurality of audio output apparatuses, corresponding to a pre-defined order of the plurality of audio output apparatuses; displaying a mode set up user interface (UI) for the audio output apparatus that output the received test signal; and in response to a first set up command being received while the mode set up UI is displayed, setting up the audio output apparatus that output the received test signal to output the noise removing signal, and in response to a second set up command being received, setting up the audio output apparatus that output the received test signal to output the audio signal.

The method may further include in response to the second set up command being received, displaying a channel set up UI; and in response to a channel set up command for a first channel being received while the channel set up UI is being displayed, setting up the audio output apparatus that output the received test signal to output an audio signal of the first channel, wherein the first channel is a left channel or a right channel.

The setting up of an audio output apparatus may include displaying a list UI for the plurality of audio output apparatuses according to the audio set up command; and in response to a command to select at least one audio output apparatus being received while the list UI is displayed, setting up the at least one audio output apparatus selected to output the audio signal, and setting up the other audio output apparatuses from among the plurality of audio output apparatuses to output the noise removing signal.

The method may further include, in response to the command to select at least one audio output apparatus being received, displaying a channel set up UI; and in response to a channel set up command for a first channel being received while the channel set up UI is displayed, setting up the at least one audio output apparatus to output an audio signal of the first channel, wherein the first channel is a left channel or a right channel.

According to an aspect of another exemplary embodiment, there is provided an electronic apparatus including a communicator configured to communicate with a first audio output apparatus from among a plurality of audio output apparatuses, and receive a noise signal at the first audio output apparatus; a signal processor configured to generate a noise removing signal based on the received noise signal; and a controller configured to provide the noise removing signal to the first audio output apparatus, and to provide a first audio signal to a second audio output apparatus from among the plurality of audio output apparatuses.

The apparatus may further include a storage configured to store a noise removing signal that is generated based on the received noise signal, wherein the controller is further configured to control the communicator to, in response to an audio reproduce command being received, provide a pre-stored noise removing signal to the first audio output apparatus, and provide the first audio signal to the second audio output apparatus.

The controller, in response to the first audio signal being provided to the second audio output apparatus, may store the first audio signal in the storage, control the signal processor to, in response to sound source data including the noise signal being received from the first audio output apparatus, extract the noise signal from the sound source data based on the stored first audio signal, and update the noise removing signal such that the noise removing signal is based on the extracted noise signal, and store the updated noise removing signal in the storage.

The controller may determine whether a frequency band of the noise signal extracted from the sound source data and a frequency band of a previous noise signal are within a predetermined range of each other, and in response to the frequency bands being outside of the predetermined range, update the noise removing signal such that the noise removing signal is based on the noise signal extracted from the sound source data, and store the updated noise removing signal.

The controller may set up an audio output apparatus from among the plurality of audio apparatuses to output the noise removing signal and set up another audio output apparatus from among the plurality of audio apparatuses to output an audio signal, according to an audio set up command.

The apparatus may further include a display, wherein the controller may provide a test signal to an audio output apparatus corresponding to a pre-defined order of the plurality of audio output apparatuses, and display a mode set up user interface (UI) for the audio output apparatus that output the received test signal, and in response to a first set up command being received while the mode set up UI is displayed, set up the audio output apparatus that output the received test signal to output the noise removing signal, and in response to a second set up command being received, set up the audio output apparatus that output the received test signal to output the audio signal.

The controller, in response to the second set up command being received, may control the display to display a channel set up UI, in response to a channel set up command for the first channel being received while the channel set up UI is displayed, set up the audio output apparatus that output the received test signal to output an audio signal of the first channel, and wherein the first channel is a left channel or a right channel.

The apparatus may further include a display, wherein the controller may be further configured to control the display to display a list UI for the plurality of audio output apparatuses according to the audio set up command, and in response to a command to select at least one audio output apparatus being received while the list UI is displayed, set up the at least one audio output apparatus selected to output an audio signal, and set up the other audio output apparatuses from among the plurality of audio output apparatuses to output a noise removing signal.

The controller, in response to a command to select at least one audio output apparatus being received, may control the display to display a channel set up UI, and in response to a channel set up command for a first channel being received while the channel set up UI is displayed, set up the at least one audio output apparatus to output an audio signal of the first channel, and wherein the first channel is a left channel or a right channel.

According to an aspect of another exemplary embodiment, there is provided an audio output system including a plurality of audio output apparatuses; and an electronic apparatus configured to, in response to receiving a noise signal at a first audio output apparatus from among the plurality of audio output apparatuses, generate a noise removing signal based on the received noise signal, and in response to an audio reproduce command being received, provide a noise removing signal to the first audio output apparatus, and provide an audio signal to a second audio output apparatus from among the plurality of audio output apparatuses.

The first audio output apparatus from among the plurality of audio output apparatuses may be an apparatus set up to output the noise removing signal that is generated based on the noise signal received in the first audio output apparatus, and the second audio output apparatus is an apparatus set up to output an audio signal of a left channel or an audio signal of a right channel.

According to an aspect of another exemplary embodiment, there is provided a method for reducing noise in an audio system, the method including: displaying a list of a plurality of audio apparatuses that are within a predetermined range of an electronic device; selecting, by touch input on the electronic device, a first audio apparatus from among the plurality of audio apparatuses; receiving a noise signal from the first audio apparatus, wherein the noise signal corresponds to external sound in a vicinity of the first audio apparatus; generating a noise removing signal based on the received noise signal; and providing the noise removing signal to the first audio apparatus so that the first audio apparatus outputs the noise removing signal.

The method may include providing an audio signal to a second audio apparatus.

The method may include receiving sound source data that includes the noise signal from the first audio apparatus that is input while the audio signal is output through the second audio apparatus.

According to the aforementioned exemplary embodiments, it is possible to output audio of high quality wherein noise is attenuated from an audio output apparatus.

BRIEF DESCRIPTION OF THE DRAWINGS

Exemplary embodiments overcome the above disadvantages and other disadvantages not described above. Also, an exemplary embodiment is not necessary to overcome the disadvantages described above, and an exemplary embodiment may not overcome any of the problems described above.

The above and/or other aspects may be more apparent in the description of exemplary embodiments with reference to the accompanying drawings, in which.

DETAILED DESCRIPTION

Figure 1:
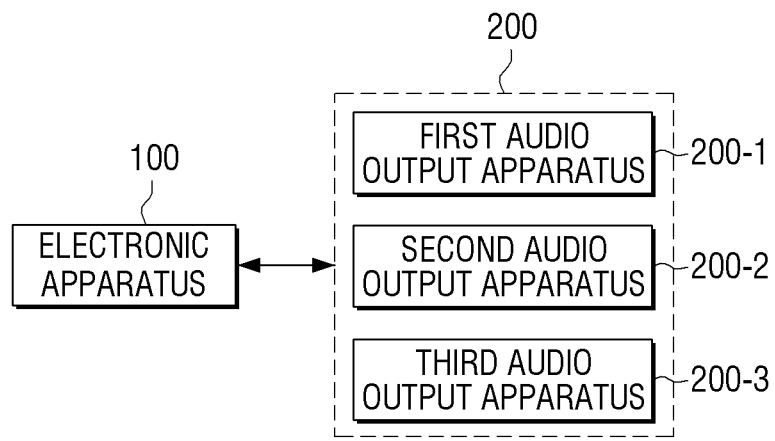
FIG. 1 is a system view illustrating an audio output system according to an exemplary embodiment.

One or more exemplary embodiments are described in detail below with reference to the accompanying drawings.

In the following description, like reference numerals refer to like elements, even in different drawings. The matters defined in the description, such as detailed construction and elements, are provided to assist in a comprehensive understanding of one or more exemplary embodiments. However, it should be appreciated by those skilled in the art that exemplary embodiments can be practiced without those specifically defined matters. Also, well-known functions or constructions might not be described in detail since it could obscure the application with unnecessary detail.

Although terms including an ordinal number such as first, second, etc., can be used for describing various elements, the structural elements are not restricted by the terms. The terms are only used to distinguish one element from another element. For example, without departing from the scope of the present disclosure, a first structural element may be named a second structural element. Similarly, the second structural element also may be named the first structural element. As used herein, the term "and/or" includes any and all combinations of one or more associated items. Expressions such as "at least one of," when preceding a list of elements, modify the entire list of elements and do not modify the individual elements of the list.

FIG. 1 is a system view illustrating an audio output system according to an exemplary embodiment.

As illustrated in FIG. 1, the audio output system may include an electronic apparatus 100 and an audio output apparatus 200. In this example, the electronic apparatus 100 is an apparatus configured to transmit an audio signal to the audio output apparatus by wire or wirelessly. For example, the electronic apparatus 100 may be a display apparatus such as a smart TV, a smart phone, a tablet PC, or a terminal apparatus that provides contents to the display apparatus.

The audio output apparatus 200 may be a speaker configured to output audio, and may be configured to include a plurality of audio output apparatuses (first to third audio output apparatuses 200-1~200-3). The electronic apparatus 100 transmits an audio signal of a channel corresponding to each of the first to third audio output apparatuses 200-1~200-3. For example, the first audio output apparatus 200-1 may be set up (e.g., configured) to output an audio signal of a first channel, the second audio output apparatus 200-2 may be set up to output an audio signal of a second channel, and the third audio output apparatus 200-3 may be set up to output an audio signal of a third channel. In this case, the electronic apparatus 100 may transmit the audio signal of the first channel to the first audio output apparatus 200-1, the audio signal of the second channel to the second audio output apparatus 200-2, and the audio signal of the third channel to the third audio output apparatus 200-3.

Accordingly, the first to third audio output apparatuses 200-1~200-3 may signal-process the audio signal of each channel received from the electronic apparatus 100 and output the signal-processed audio signal in an audible sound format.

The first to third audio output apparatuses 200-1~200-3 may be provided with a microphone, and through this microphone, the first to third audio output apparatuses 200-1~200-3 may receive sound (e.g., noise) generated by an external environment. Therefore, at least one of the first to third audio output apparatuses 200-1~200-3 may transmit an input noise signal to the electronic apparatus 100. More specifically, the user may set up at least one of the first to third audio output apparatuses 200-1~2003 to output a noise removing signal, and set up the remaining audio output apparatuses to output an audio signal of a left channel (e.g., L channel) and an audio signal of a right channel (e.g., R channel), through the electronic apparatus 100. When a command for such a set up is input (e.g., received), the electronic apparatus 100 may transmit (e.g., provide) user setting information to the audio output apparatus of the first to third audio output apparatuses 200-1~200-3 that is set up to output the noise removing signal.

Therefore, the audio output apparatus of the first to third audio output apparatuses 200-1~200-3 that received the user setting information receives the noise signal generated by the surrounding environment through a microphone and transmits the noise signal to the electronic apparatus 100. For example, when the first audio output apparatus 200-1 of the first to third audio output apparatuses 200-1~200-3 is set up to output the noise removing signal, the first audio output apparatus 200-1 receives the noise signal generated by the external environment surrounding the first audio output apparatus 200-1 and transmits the noise signal to the electronic apparatus 100.

Accordingly, when the noise signal is received from the first audio output apparatus 200-1, the electronic apparatus 100 generates a noise removing signal for the noise signal using a noise removing algorithm. Then, when an audio reproduce command is input by the user, the electronic apparatus 100 transmits the noise removing signal to the first audio output apparatus 200-1 that transmitted the noise signal, and transmits an audio signal set up to each of the second and third audio output apparatuses 200-2, 200-3.

Accordingly, the first audio output apparatus 200-1 may output the noise removing signal, while the second and third audio output apparatuses 200-1, 200-3 output the audio signal of the channel set up for each of them. Therefore, the audio output system according to an exemplary embodiment may attenuate noise in the space from which audio is output through the second and third audio output apparatuses 200-2, 200-3.

Meanwhile, as aforementioned, when an audio signal is output through the second and third audio output apparatuses 200-2, 200-3, the first audio output apparatus 200-1, which is set up to output the noise removing signal, may receive sound source data that includes the noise signal generated in the external environment near the first audio output apparatus 200-1, and the audio signal output through the second and third audio output apparatuses 200-2, 200-3.

When sound source data is received in the electronic apparatus 100, the electronic apparatus 100 separates a frequency component of the audio signal output through the second and third audio output apparatuses 200-2, 200-3 and a frequency component of the noise signal from the pre-received sound source data using the Fast Fourier Transformation (FFT). Then, the electronic apparatus analyzes the frequency component of the noise signal separated from the sound source data to generate a noise removing signal for removing the noise signal, and transmits the generated noise removing signal to the first audio output apparatus 200-1.

Therefore, the audio output system according to an exemplary embodiment may continuously attenuate noise that is generated in the space where the user is located with audio being output to the space where the user is located through the second and third audio output apparatuses 200-2, 200-3.

Above, the audio output system according to an exemplary embodiment was briefly explained. Below, each component of the electronic apparatus 100 and audio output apparatus 200 according to one or more exemplary embodiments will be explained in detail.

Figure 2:
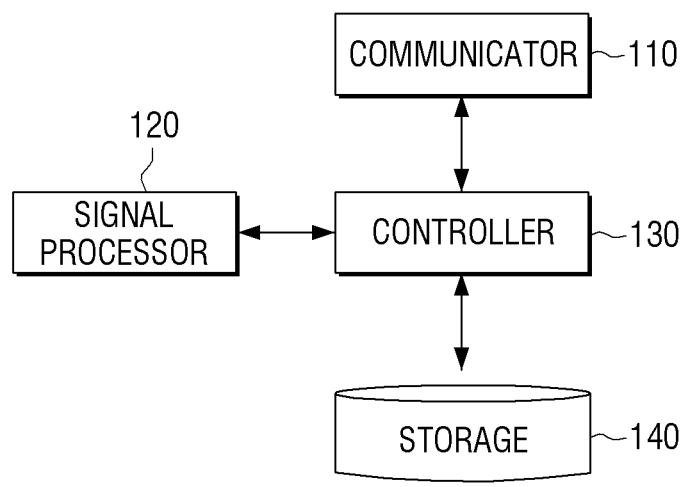
FIG. 2 is a block diagram of an electronic apparatus according to an exemplary embodiment.

FIG. 2 is a block diagram of the electronic apparatus according to an exemplary embodiment.

As illustrated in FIG. 2, the electronic apparatus 100 includes a communicator 110, signal processor 120, controller 130 and storage 140.

The communicator 110 performs data communication with the plurality of audio output apparatuses 200-1~200-3 by wire or wirelessly. Especially, the communicator 110 performs data communication with a first audio output apparatus 200-1 that receives a noise signal.

The communicator 110 may include an interface module that includes at least one of a wireless communication module such as a wireless LAN communication module, short distance wireless communication module, and wireless communication module, and a wired communication module such as an HDMI (High-Definition Multimedia Interface), USB (Universal Serial Bus), and IEEE (Institute of Electrical and Electronics Engineers) 1394.

In this example, the wireless LAN module is a configuration for accessing a wireless AP (access point) that exists within a predetermined range and connecting to the Internet according to a control command of the controller 130. Such a wireless LAN module supports the wireless LAN standard (IEEE802.11x) of the IEEE.

The short distance wireless communication module is a module for performing data communication with the first to third audio output apparatuses 200-1~200-3 and peripheral apparatuses that exist in a short distance range according to a bluetooth and short distance wireless communication method. Such a short distance wireless communication module may include at least one of a bluetooth module, IrDA (infrared data association) module, NFC (Near Field Communication) module, Wi-Fi module, and Zigbee module.

As such, the communicator 110 may be realized by the aforementioned various short distance communication methods, and when necessary, the communicator 110 may be replaced by another communication technique not mentioned in the present disclosure.

Meanwhile, the interface module may perform data communication using at least one of USB 2.0, USB 3.0, HDMI, and IEEE 1394. More specifically, the interface module may transmit data stored in the storage 140 of the electronic apparatus 100 or receive data from peripheral apparatuses through the peripheral apparatuses including the first to third audio output apparatuses 200-1~200-3 using a wired cable.

The signal processor 120 generates a noise removing signal based on a noise signal received from at least one first audio output apparatus 200-1 through the communicator 110. In an exemplary embodiment, when a noise signal is received from a first audio output apparatus 200-1, the signal processor 120 may perform phase inversion on the noise signal using a noise removing algorithm and generate a noise removing signal.

The controller 130 controls the communicator to transmit the noise removing signal to the at least one first audio output apparatus 200-1, and to transmit the audio signal to the second audio output apparatus 200-2 of the plurality of audio output apparatuses 200.

Meanwhile, when an audio reproduce command is input by the user, the controller 130 controls the communicator 110 to transmit the noise removing signal pre-stored in the storage 140, and to transmit the audio signal corresponding to the audio reproduce command to the second audio output apparatus 200-2. Accordingly, the communicator 110 may transmit the noise removing signal to the first audio output apparatus 200-1 and transmit the audio signal to the second audio output apparatus 200-2. Therefore, the first audio output apparatus 200-1 may output the noise removing signal received from the electronic apparatus 100 to the outside, and the second audio output apparatus 200-2 may output the audio signal received from the electronic apparatus 100 to the outside.

Meanwhile, the storage 140 stores the noise removing signal generated based on the noise signal received from the first audio output apparatus 200-1. In this example, the storage 140 may store identification information of the first audio output apparatus 200-1 together with the noise removing signal generated based on the noise signal received from the first audio output apparatus 200-1. Accordingly, the communicator 110 may transmit the noise removing signal to the first audio output apparatus 200-1 based on the identification information pre-stored in the storage 140.

The storage 140 that stores the noise removing signal may perform operations of the electronic apparatus 100 using not only various data but also the operating system and resources of the operating system for controlling operations of the electronic apparatus 100, and stores various application programs that provide a user interface. The storage 140 may also store various multimedia data processed according to a control command of the controller 130, contents data, and data received from an external source. A storage 140 may be realized as at least one of a memory card (for example, SD card, memory stick) that may be attached/detached to/from a ROM, RAM or display apparatus 100, nonvolatile memory, volatile memory, hard disk drive (HDD) and solid state drive (SSD).

Meanwhile, when a first audio signal that corresponds to an audio reproduce command by the user is transmitted to the second audio output apparatus 200-2, the controller 130 stores the first audio signal in the storage 140.

Also, the first audio output apparatus 200-1 may, in response to an audio corresponding to the first audio signal being output through the second audio output apparatus 200-2, receive sound source data that includes the noise signal generated around the first audio output apparatus 200-1 and the first audio signal for the audio output through the second audio output apparatus 200-2. When such sound source data is input, the first audio output apparatus 200-1 transmits the sound source data input to the electronic apparatus 100.

When such sound source data is received by the electronic apparatus 100, the controller 130 controls the signal processor 120 to extract the noise signal from the sound source data based on the first audio signal pre-stored in the storage 140, and to generate a noise removing signal based on the extracted noise signal. According to such a control command, the signal processor 120 may separate the audio signal and noise signal from the sound source data based on the first audio signal pre-stored in the storage, and may generate the noise removing signal from the separated noise signal.

According to an exemplary embodiment, the signal processor 120 may separate the frequency component of the audio signal and the frequency component of the noise signal from the pre-received sound source data using Fast Fourier Transformation (FFT). Then, the signal processor 120 may analyze the frequency component of the noise signal separated from the sound source data and generate the noise removing signal for removing the noise signal.

When such a noise removing signal is generated, the controller 130 updates the noise removing signal pre-stored in the storage 140 to a pre-generated noise removing signal. For example, the storage 140 may store the first noise removing signal, and the signal processor 120 may generate a second noise removing signal based on the noise signal extracted from the sound source data. In this example, the controller 130 may update the first noise removing signal pre-stored in the storage 140 to the second noise removing signal and store the updated second noise removing signal in the storage 140.

Meanwhile, according to an exemplary embodiment, the controller 130 determines whether a frequency band of the noise removing signal generated based on the noise signal extracted from the sound source data and a frequency band of the noise removing signal pre-stored in the storage 140 are within a predetermined range. If it is determined that the frequency bands are outside the predetermined range, the controller 130 updates the noise removing signal pre-stored in the storage 140 to the noise removing signal generated based on the noise signal extracted from the sound source data, and stores the updated noise removing signal in the storage 140.

As described above, the storage 140 may store the first noise removing signal, and the signal processor 120 may generate the second noise removing signal based on the noise signal extracted from the sound source data. In this case, the controller 130 may compare the frequency band of the first noise removing signal pre-stored in the storage 140 with the frequency band of the second noise removing signal, and when they are outside the predetermined range, the controller 130 may update the first noise removing signal pre-stored in the storage 140 to the second noise removing signal.

Meanwhile, when an audio set up command is input by the user, the controller 130 may set up an audio output apparatus of the plurality of audio output apparatuses 200 to output a noise removing signal and set up an audio output apparatus of the plurality of audio output apparatuses 200 to output an audio signal according to the input audio set up command. In this example, the electronic apparatus 100 may include an exemplary configuration such as the configuration of FIG. 3.

Figure 3:
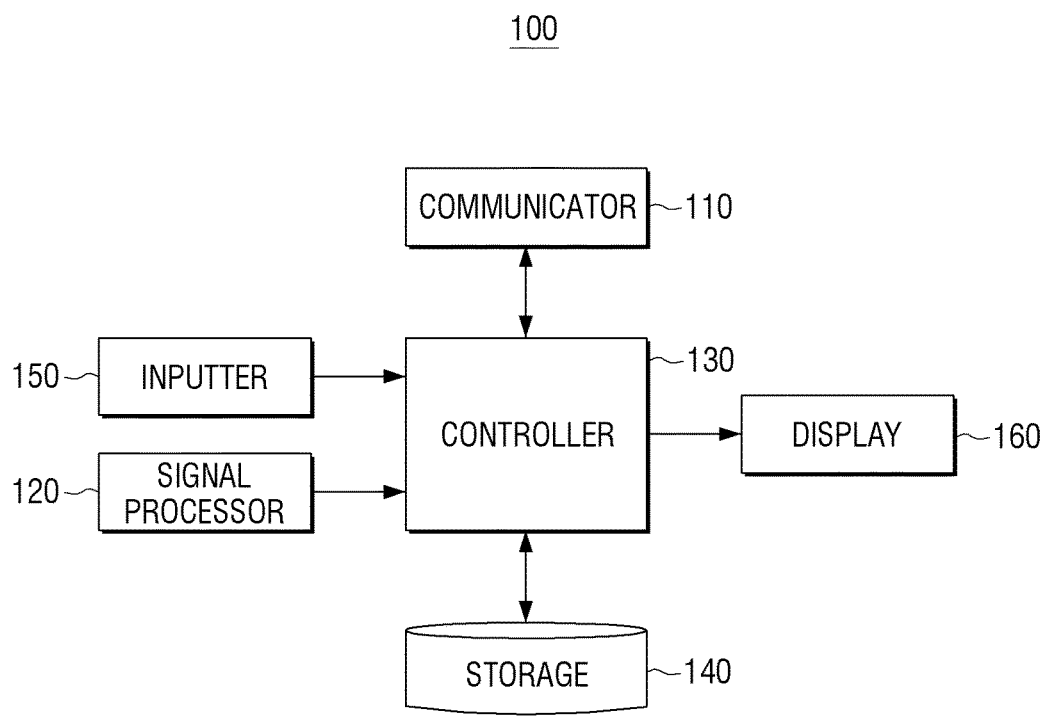
FIG. 3 is a detailed block diagram of an electronic apparatus according to an exemplary embodiment.

FIG. 3 is a block diagram illustrating in detail an electronic apparatus 100 according to an exemplary embodiment.

As illustrated in FIG. 3, the electronic apparatus 100 may further include an inputter 150 and display 160 in addition to the communicator 110, signal processor 120, controller 130 and storage 140.

The inputter 150 may receive a user's manipulation command through a manipulator or receive a user's touch command through a touch panel formed on the display 160. Herein, the user's manipulation command and touch command are commands for controlling operations of the electronic apparatus 100, and these may include at least one of an audio reproduce command for reproducing audio and an audio set up command regarding the audio output apparatus 200.

The display 160 displays a variety of data, UI and contents processed according to a control command of the controller 130 on a screen. It may be realized in an integrated format with the touch panel for inputting a user's touch command. Therefore, the display 160 may not only display various data and contents according to the control command of the controller 130 on the screen, but also receive a touch command regarding a UI displayed on the screen through the touch panel.

Meanwhile, when an audio set up command is input by the user through the inputter 150, the controller 130 may set up an audio output apparatus of the plurality of audio output apparatuses 200 to output a noise removing signal and set up an audio output apparatus of the plurality of audio output apparatuses 200 to output an audio signal according to an exemplary embodiment explained below.

According to an exemplary embodiment, the controller 130 controls the communicator 110 to transmit a test signal to the audio output apparatus 200 of the plurality of audio output apparatuses 200 that corresponds to a pre-defined order. Then, the controller 130 controls the display 160 to display a mode set up UI for the audio output apparatus 200 that output the test signal.

According to such a control command, the display 160 displays the mode set up UI regarding the audio output apparatus 200 that outputs the test signal. When a first set up command is input by the user with such a mode set up UI displayed, the controller 130 sets up such that a noise removing signal may be output from the audio output apparatus 200 that transmitted the test signal. Meanwhile, when a second set up command is input by the user with the mode set up UI displayed, the controller 130 sets up such that an audio signal corresponding to the audio that the user requested may be output from the audio output apparatus 200 that output the test signal.

Herein, when the second set up command is input by the user, the controller 130 controls the display 160 to generate a channel set up UI, and to display the generated channel set up UI. Herein, the channel set up UI may be a UI for selecting a channel through which an audio signal may be output from at least one audio output apparatus 200 selected by the user. Accordingly, the display 160 displays the channel set up UI regarding the audio output apparatus 200 that output the test signal.

When a channel set up command regarding a first channel is input by the user with such a channel set up UI displayed, the controller 130 sets up such that an audio signal of the first channel may be output from the audio output apparatus 200 that transmitted the test signal. Herein, the first channel may be a left channel (e.g., L channel) or a right channel (e.g., R channel). That is, when a channel set up command regarding L channel is input by the user, the controller 130 sets up such that an audio signal of L channel may be output from the audio output apparatus 200 that output the test signal. Meanwhile, when a channel set up command regarding R channel is input by the user, the controller 130 sets up such that an audio signal of R channel may be output from the audio output apparatus 200 that output the test signal.

According to another exemplary embodiment, when an audio set up command is input by the user, the controller 130 controls the display 160 to display a list UI regarding the plurality of audio output apparatuses 200. Accordingly, the display 160 may display the list UI that includes the plurality of audio output apparatuses 200 on the screen.

When a command to select at least one audio output apparatus 200 is input with the list UI displayed, the controller 130 sets up such that an audio signal may be output from the at least one audio output apparatus 200 selected, and such that a noise removing signal may be output from the rest of the audio output apparatuses 200.

Herein, when the command to select at least one audio output apparatus 200 is input, the controller 130 may control the display 160 to display a channel set up UI. Herein, the channel set up UI may be a UI for selecting a channel through which an audio signal may be output from the at least one audio output apparatus 200 selected by the user. According to such a control command, the display 160 may display the channel set up UI regarding the at least one audio output apparatus 200 selected by the user.

As such, when a channel set up command regarding the first channel is input with the channel set up UI regarding the at least one audio output apparatus 200 selected by the user is displayed, the controller 130 sets up such that an audio signal of the first channel may be output from the at least one audio output apparatus selected by the user.

That is, when a channel set up command is input by the user regarding L channel, the controller 130 sets up such that an audio signal of L channel may be output from the at least one audio output apparatus 200 selected by the user. Meanwhile, when a channel set up command regarding R channel is input by the user, the controller 130 sets up such that an audio signal of R channel may be output from the at least one audio output apparatus 200 selected by the user.

When the audio setting for the plurality of audio output apparatuses 200 is completed through the aforementioned exemplary embodiments, the controller 130 controls the communicator 110 to transmit first user set up information to the at least one audio output apparatus 200 set up to output a noise removing signal of the plurality of audio output apparatuses 200. Furthermore, the controller 130 controls the communicator 110 to transmit second user set up information to the rest of the audio output apparatuses 200 of the plurality of audio output apparatuses 200 set up to output an audio signal.

Accordingly, the communicator 110 transmits the first user set up information to the at least one audio output apparatus 200 set up to output the noise removing signal, and transmits the second user set up information to the rest of the audio output apparatuses 200 set up to output the audio signal. Therefore, of the plurality of audio output apparatuses 200, the at least one audio output apparatus 200 that received the first user set up information from the electronic apparatus 100 may receive a noise signal generated by the surrounding environment or sound source data including the noise signal through the microphone, and transmit the same to the electronic apparatus 100.

Next, components of the audio output apparatus will be explained in detail.

Figure 4:
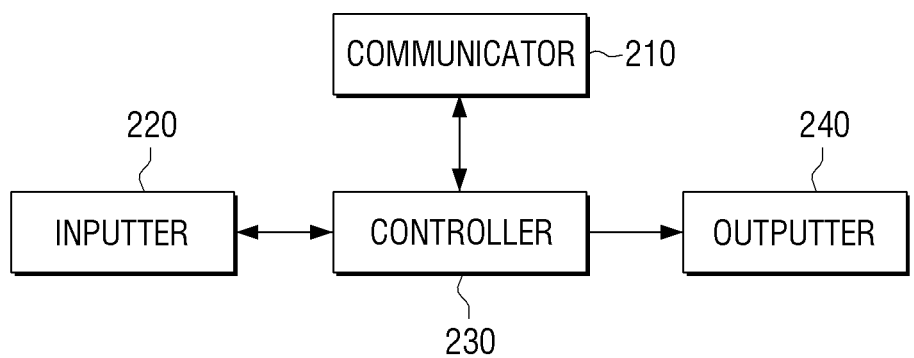
FIG. 4 is a block diagram of an audio output apparatus according to an exemplary embodiment.

FIG. 4 is a block diagram of an audio output apparatus according to an exemplary embodiment.

As illustrated in FIG. 4, the audio output apparatus 200 includes a communicator 210, inputter 220, controller 230 and outputter 240.

The communicator 210 performs data communication with the electronic apparatus 100 and other surrounding output apparatuses 200 by wire or wirelessly.

The inputter 220 receives a noise signal generated in the surrounding environment through a microphone. Not only that, the inputter 220 may receive sound source data that includes the noise signal generated in the surrounding environment and an audio signal output from other audio output apparatuses 200 through the microphone.

The controller 230 controls the overall operations of each component of the audio output apparatus 200. When the audio output apparatus 200 is set up to output a noise removing signal, the controller 230 controls the inputter to receive the noise signal generated in the surrounding (e.g., external) environment or sound source data including the noise signal through the microphone. According to such a control command, the inputter 220 receives the noise signal generated in the surrounding environment or sound source data that includes the noise signal through the microphone, and the controller 230 controls the communicator 210 to transmit the noise signal or sound source data input to the electronic apparatus 100. According to such a control command, the communicator 210 transmits the noise signal or sound source data that includes the noise signal to the electronic apparatus 100.

Accordingly, the electronic apparatus 100 generates a noise removing signal based on the noise signal or sound source data received from the audio output apparatus set up to output the noise removing signal, and transmits the generated noise removing signal to the corresponding audio output apparatus 200.

When such a noise removing signal is received, the outputter 240 may process the received noise removing signal in an outputtable format, and output the processed noise removing signal to the outside.

Next, operations of transmitting (e.g., providing) a noise removing signal and audio signal from the electronic apparatus 100 to the plurality of audio output apparatuses 200 according to one or more exemplary embodiments will be explained in detail.

Figure 5:
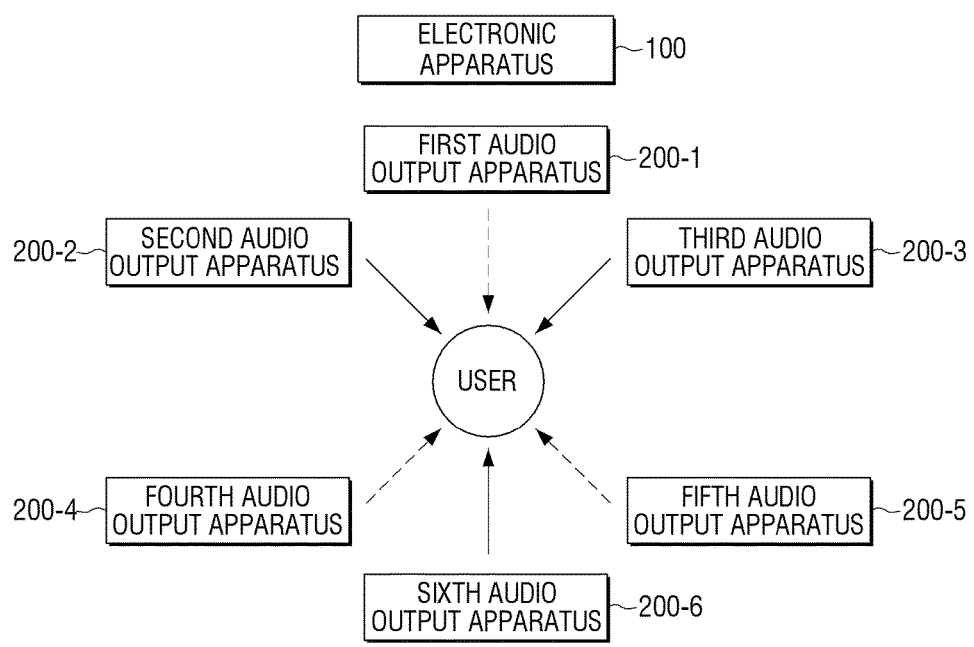
FIG. 5 is an exemplary view illustrating transmitting a noise removing signal and audio signal from an electronic apparatus of an audio output system to a plurality of audio output apparatuses according to an exemplary embodiment.

FIG. 5 is an exemplary view of transmitting a noise removing signal and audio signal from an electronic apparatus of an audio output system to a plurality of audio output apparatuses according to an exemplary embodiment.

As illustrated in FIG. 5, the audio output system that includes the electronic apparatus 100 and the plurality of audio output apparatuses 200 may be realized as a home theater multi-channel system of 5.1 channel.

In this example, an audio output channel of a first to sixth audio output apparatuses 200-1~200-6 may be set up as follows. The first audio output apparatus 200-1 may be basically set up to output an audio signal of a center (C) channel, and the second and third audio output apparatuses 200-2, 200-3 may be set up to output an audio signal of a Front L channel and an audio signal of Front R channel, respectively. Also, the fourth and fifth audio output apparatuses 200-4, 200-5 may be set up to output an audio signal of a Rear L channel and an audio signal of a Rear R channel, respectively, and the sixth audio output apparatus 200-6 may be set up as a subwoofer.

Therefore, when an audio signal of 5.1-channel is input, the electronic apparatus 100 may transmit an audio signal of a channel corresponding to an audio output channel predetermined for each of the first to sixth audio output apparatuses 200-1~200-6. Furthermore, when audio signals of two channels are input, the electronic apparatus 100 may transmit an audio signal of each channel to the audio output apparatus of the first to sixth audio output apparatuses 200-1~200-6 set up as the audio output channel corresponding to each audio signal of 2-channel.

As such, with the audio output channel of the first to sixth audio output apparatuses 200-1~200-6 basically set up, the user may set up the first, fourth, and fifth audio output apparatus 200-1, 200-4, 200-5 to output a noise removing signal, and set up the rest of the second, third, and sixth audio output apparatus 200-2, 200-3, 200-6 to output an audio signal corresponding to each channel. In this case, from where each of the first, fourth, and fifth audio output apparatuses 200-1, 200-4, 200-5 are positioned, each of the first, fourth, and fifth audio output apparatus 200-1, 200-4, 200-5 receives the noise signal generated by the surrounding environment, and transmits the input noise signal to the electronic apparatus 100. In this example, when an audio signal is output from at least one of the second, third and sixth audio output apparatuses 200-2, 200-3, 200-6, each of the first, fourth, and fifth audio output apparatus 200-1, 200-4, 200-5 may receive sound source data that includes the noise signal generated from each point of the first, fourth, and fifth audio output apparatuses 200-1, 200-4, 200-5 and the audio signal output from at least one of the other audio output apparatuses 200-2, 200-3, 200-6, and transmit the sound source data input to the electronic apparatus 100.

Accordingly, the electronic apparatus 100 generates a noise removing signal based on the noise signal received from each of the first, fourth and fifth audio output apparatus 200-1, 200-4, 200-5. Then, when an audio reproduce command is input by the user or when an audio is being reproduced, the electronic apparatus 100 may transmit the noise removing signal generated based on each noise signal to the first, fourth and fifth audio output apparatus 200-1, 200-4, 200-5, and output an audio signal to the second, third, and sixth audio output apparatus 200-2, 200-3, 200-6.

That is, the first, fourth, and fifth audio output apparatuses 200-1, 200-4, 200-5 may attenuate the noise being generated in the space where the user is located by outputting the noise removing signal towards a direction where the user is located.

Figure 6:
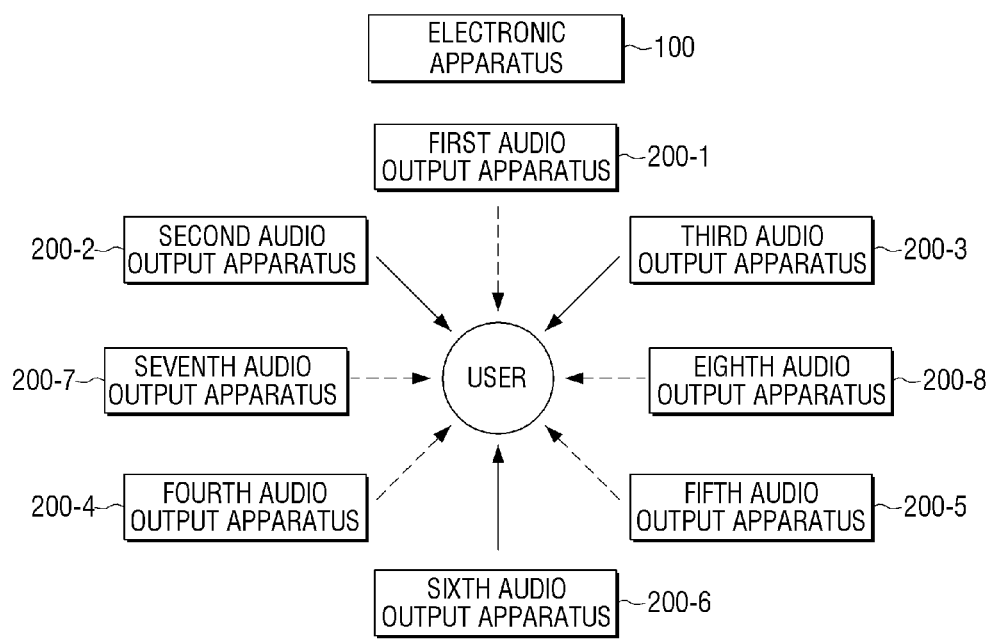
FIG. 6 is another exemplary view illustrating transmitting a noise removing signal and audio signal from an electronic apparatus of an audio output system to a plurality of audio output apparatuses according to an exemplary embodiment.

FIG. 6 is another exemplary view of transmitting a noise removing signal and audio signal to a plurality of audio output apparatuses from an electronic apparatus of an audio output system according to another exemplary embodiment.

As illustrated in FIG. 6, the audio output system may be realized as a home theater multi-channel system of 7.1-channel.

In this example, audio output channels of a first to eighth audio output apparatuses 200-1~200-8 may be basically set up as follows. That is, the first audio output apparatus 200-1 may be basically set up to output an audio signal of center (C) channel, and the second and third audio output apparatuses 200-2, 200-3 may be set up to output an audio signal of a front L channel and an audio signal of a front R channel, respectively. In addition, the fourth and fifth audio output apparatuses 200-4, 200-5 may be set up to each output an audio signal of a Rear L channel and an audio signal of a Rear R channel, respectively, and the sixth audio output apparatus 200-6 may be set up as a Subwoofer. In addition, the seventh and eighth audio output apparatus 200-7, 200-8 may be set up to output an audio signal of a Surround L channel and an audio signal of a Surround R channel, respectively.

Therefore, when an audio signal of 7.1 channel is input, the electronic apparatus 100 may transmit an audio signal of a channel corresponding to an audio output channel predetermined to each of the first to eighth audio output apparatuses 200-1~200-8. Furthermore, when an audio signal of a sub channel such as 2-channel is input, the electronic apparatus 100 may transmit an audio signal of a corresponding channel to an audio output apparatus set up to an audio output channel corresponding to an audio signal of each channel of the first to eighth audio output apparatuses 200-1~200-8.

Therefore, with an audio output channel of the first to eighth audio output apparatuses 200-1~2008 basically set up, the user may set up the first, fourth, fifth, sixth, seventh, and eighth audio output apparatuses 200-1, 200-4, 200-5, 200-6, 200-7, 200-8 of the first to eighth audio output apparatuses 200-1~200-8 to output a noise removing signal, and set up the rest of the second, third, and sixth audio output apparatuses 200-2, 200-3, 200-6 to output an audio signal corresponding to each channel. In such a case, at each point of the first, fourth, fifth, sixth, seventh, and eighth audio output apparatuses 200-1, 200-4, 200-5, 200-6, 200-7, 200-8, each of the first, fourth, fifth, sixth, and seventh audio output apparatuses 200-1, 200-4, 200-5, 200-6, 200-7, 200-8, receives a noise signal generated by the surrounding environment, and transmits the input noise signal to the electronic apparatus 100. Herein, when an audio signal is output from at least one of the second, third and sixth audio output apparatuses 200-2, 200-3, 200-6, each of the first, fourth, fifth, sixth, seventh, and eighth audio output apparatuses 200-1, 200-4, 200-5, 200-6, 200-7, 200-8 may receive sound source data that includes the noise signal generated in each point and an audio signal output from at least one of the rest of the audio output apparatuses 200-2, 200-3, 200-6, and transmit the input sound source data to the electronic apparatus 100.

Accordingly, the electronic apparatus 100 generates a noise removing signal based on the noise signal received from each of the first, fourth, fifth, sixth, seventh, and eighth audio output apparatuses 200-1, 200-4, 200-5, 200-6, 200-7, 200-8. Then, when an audio reproduce command is input by the user or when an audio is being reproduced, the electronic apparatus 100 may transmit the noise removing signal generated based on each noise signal to the first, fourth, fifth, sixth, seventh, and eighth audio output apparatuses 200-1, 200-4, 200-5, 200-6, 200-7, 200-8 and may output an audio signal to the second, third, and sixth audio output apparatus 200-2, 200-3, 200-6.

That is, by outputting the noise removing signal towards the direction where the user is located, the first, fourth, fifth, sixth, seventh, and eighth audio output apparatuses 200-1, 200-4, 200-5, 200-6, 200-7, 200-8 may attenuate the noise generated in the space where the user is located.

Next, operations for setting up the audio output apparatus to output a noise removing signal of the plurality of audio output apparatuses 200 and setting up the audio output apparatus to output an audio signal of the plurality of audio output apparatuses 200 will be explained.

Figure 7:
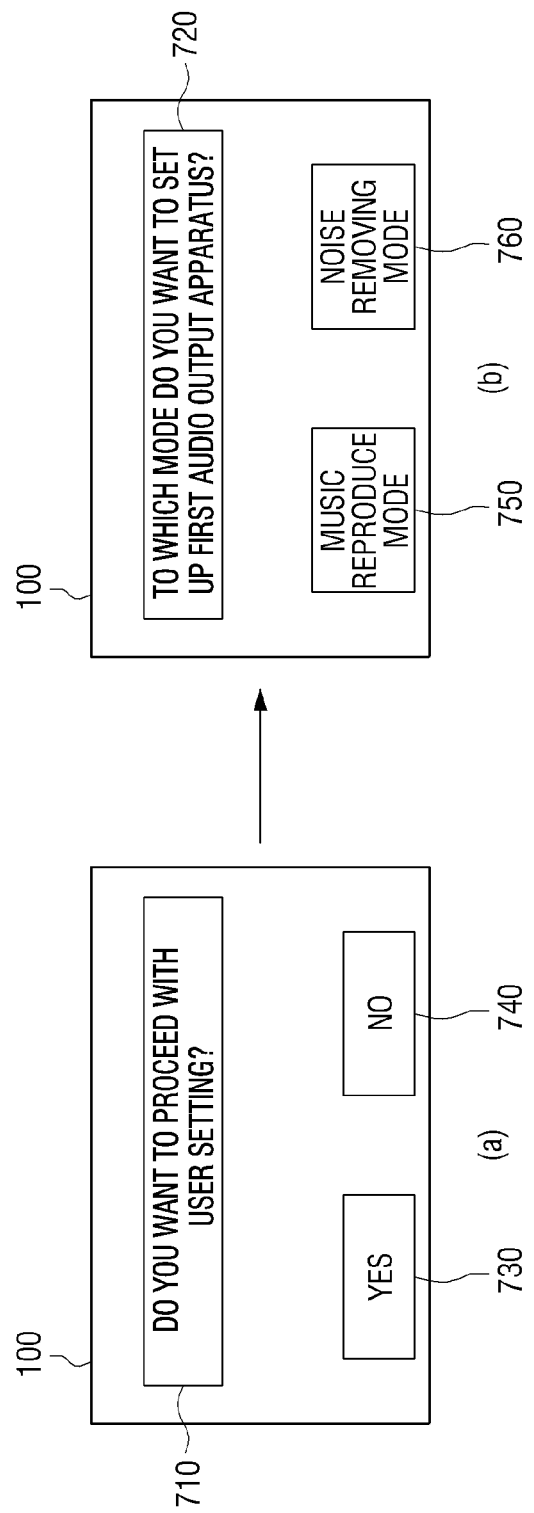
FIG. 7 is an exemplary view illustrating setting up a mode of an audio put apparatus in an electronic apparatus according to an exemplary embodiment.
Figure 8:
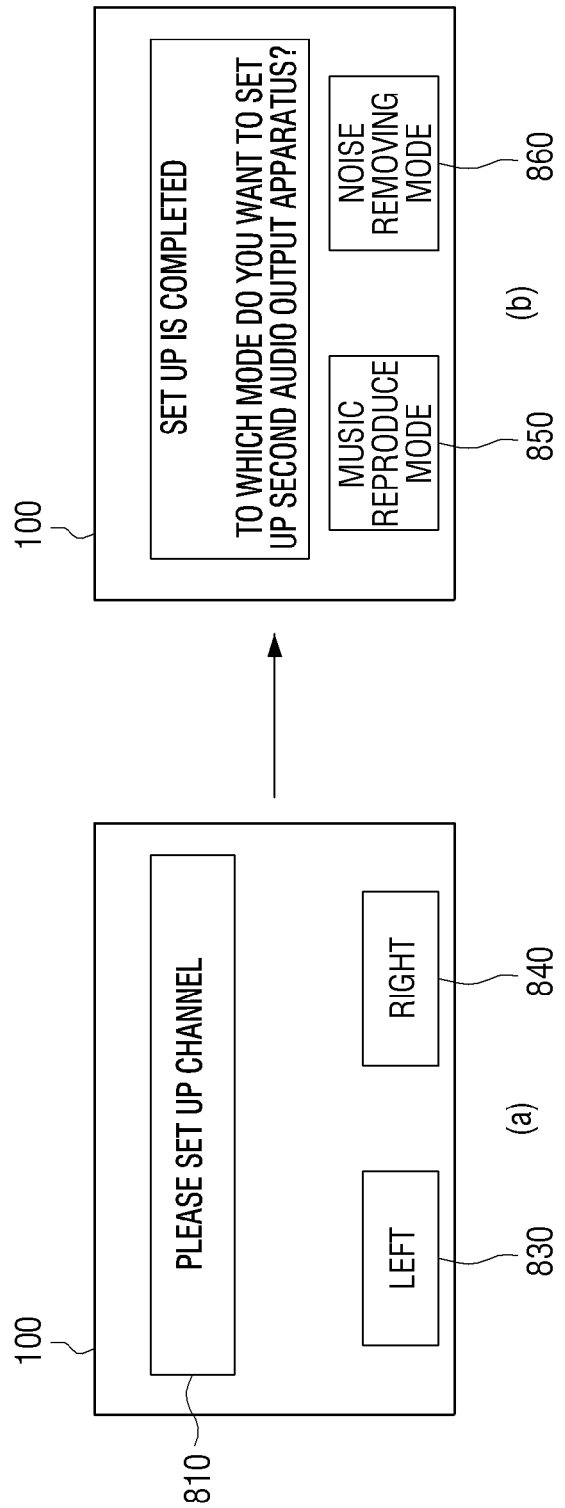
FIG. 8 is an exemplary view illustrating setting up a channel of an audio output apparatus in an electronic apparatus and setting up a mode of another audio output apparatus according to an exemplary embodiment.
Figure 9:
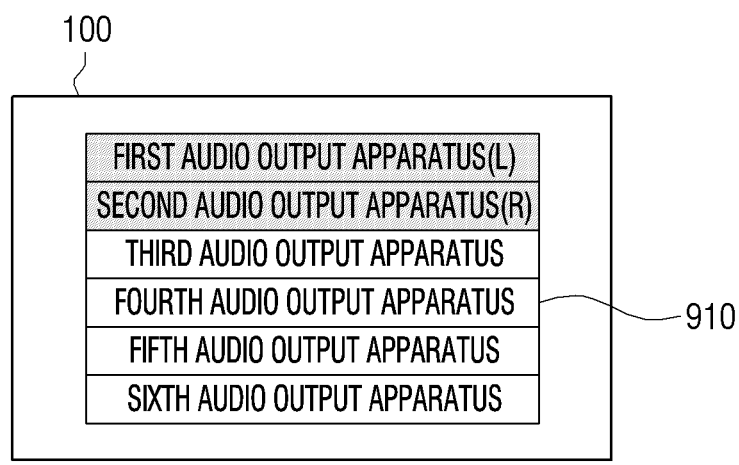
FIG. 9 is an exemplary view illustrating a completion of setting up a mode of an audio output apparatus in an electronic apparatus according to an exemplary embodiment.

FIG. 7 is an exemplary view illustrating setting up a mode of an audio output apparatus in an electronic apparatus according to an exemplary embodiment, FIG. 8 is an exemplary view illustrating setting up a channel of an audio output apparatus in an electronic apparatus and a mode of another audio output apparatus according to an exemplary embodiment; and FIG. 9 is an exemplary view illustrating a completion of setting up a mode of an audio output apparatus in an electronic apparatus according to an exemplary embodiment.

As illustrated in (a) of FIG. 7, when an audio set up command is input by the user, the electronic apparatus 100 displays an audio set up proceeding UI 710 that reads "Do you want to proceed with user setting?(Yes (icon 730)/No (icon 740))". When "Yes" icon is selected with the audio set up proceeding UI 710 displayed, the electronic apparatus 100 transmits a test signal to the first audio output apparatus 200-1 of the pre-registered plurality of audio output apparatuses 200 in a pre-defined order. Then, as illustrated in (b) of FIG. 7, the electronic apparatus 100 displays a mode set up UI 720 that reads "To which mode do you want to set up the first audio output mode?(music reproduce mode (750)/ noise removing mode (760))". When a first icon that reads "noise removing mode" is selected, the electronic apparatus 100 may set up the first audio output apparatus 200-1 as the audio output apparatus to output a noise removing signal.

Meanwhile, when a second icon that reads "music reproduce mode" is selected with the mode set up UI 720 displayed, the electronic apparatus 100 displays a channel set up UI 810 that reads "Please set up a channel (Left (830)/Right (840))" as illustrated in (a) of FIG. 8.

When the first icon that reads "Left" is selected with the channel set up UI 810 displayed, the electronic apparatus 100 sets up the first audio output apparatus 200-1 to output an audio signal of L channel. Meanwhile, when a second icon that reads "Right" is selected with the channel set up UI 810 displayed, the electronic apparatus 100 sets up the first audio output apparatus 200-1 to output an audio signal of R channel.

As such, when the mode setting for the first audio output apparatus 200-1 is completed, the electronic apparatus 100 transmits a test signal to the second audio output apparatus 200-2 of the plurality of audio output apparatuses 200 corresponding to the predetermined order. Then, as illustrated in (b) of FIG. 8, the electronic apparatus 100 displays a new mode set up UI 820 that reads "Set up is completed. To which mode do you want to set up the second audio output mode?(music reproduce mode (850)/noise removing mode (860))". As such, the electronic apparatus 100 performs mode setting for each of the plurality of audio output apparatuses 200 by repeating the operations of FIGS. 7 and 8. When mode setting for each of the plurality of audio output apparatuses 200 is completed, the electronic apparatus 100 may display a mode set up list UI 910 for each of the plurality of audio output apparatuses 200.

For example, when the first and second audio output apparatuses 200-1, 200-2 of the first to sixth audio output apparatuses 200-1~200-6 are set up to output an audio signal of L channel and an audio signal of R channel, respectively, and the rest of the audio output apparatuses 200-3~200-6 are set up to output a noise removing signal, the electronic apparatus 100 may display a mode set up list UI 910 in which channel setting information and highlight are displayed on an area where the first and second audio output apparatuses 200-1, 200-2 set up to output the audio signal of L channel and an audio signal of R channel are displayed. Accordingly, the user may easily confirm the mode setting and channel information per audio output apparatus 200-1~200-6 through the mode set up list UI 910 displayed on the screen of the electronic apparatus 100.

Figure 10:
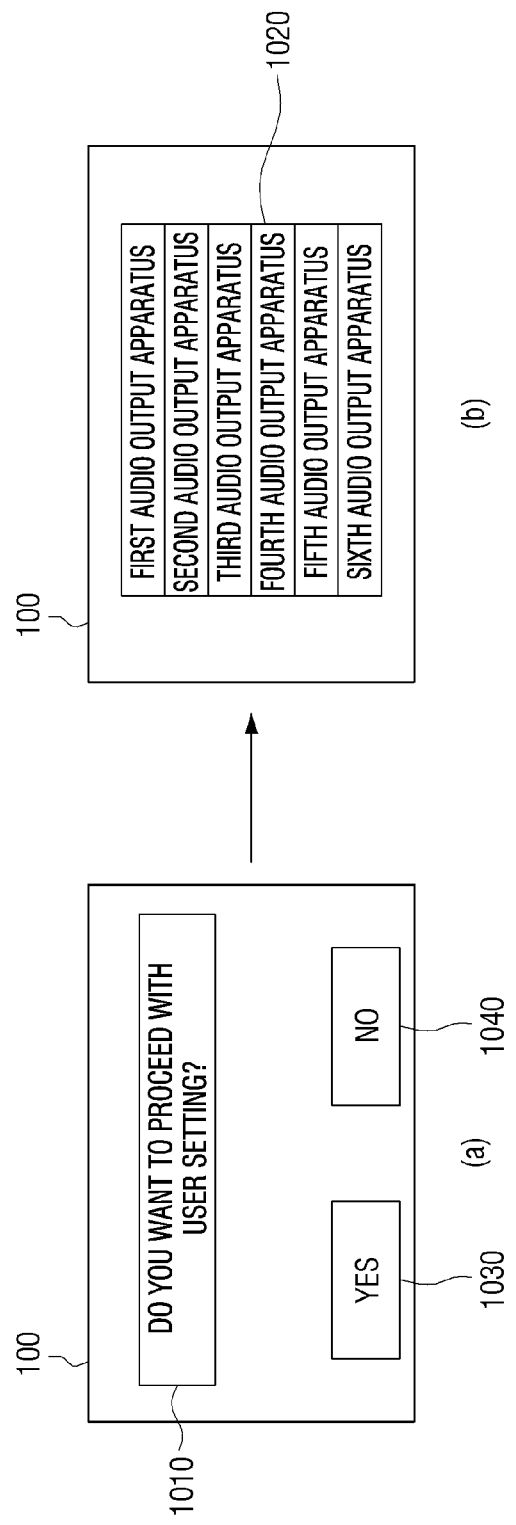
FIG. 10 is an exemplary view illustrating setting up a mode of an audio output apparatus in an electronic apparatus according to another exemplary embodiment.
Figure 11:
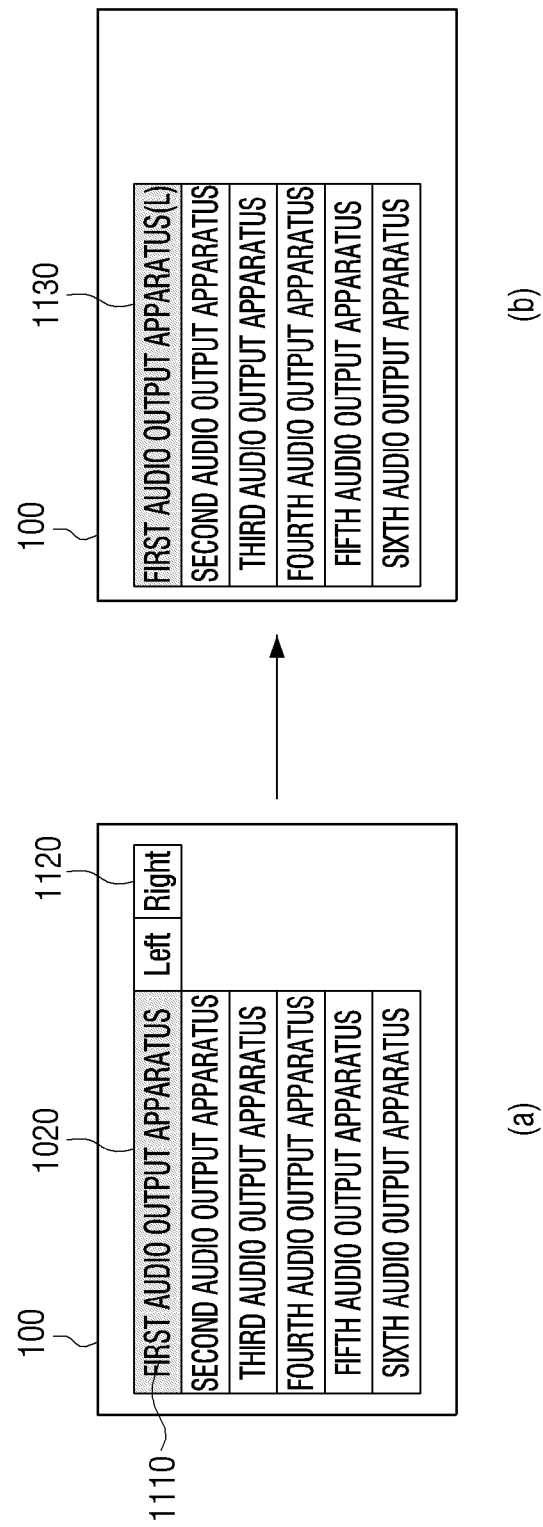
FIG. 11 is an exemplary view illustrating setting up a channel of an audio output apparatus in an electronic apparatus according to an exemplary embodiment.
Figure 12:
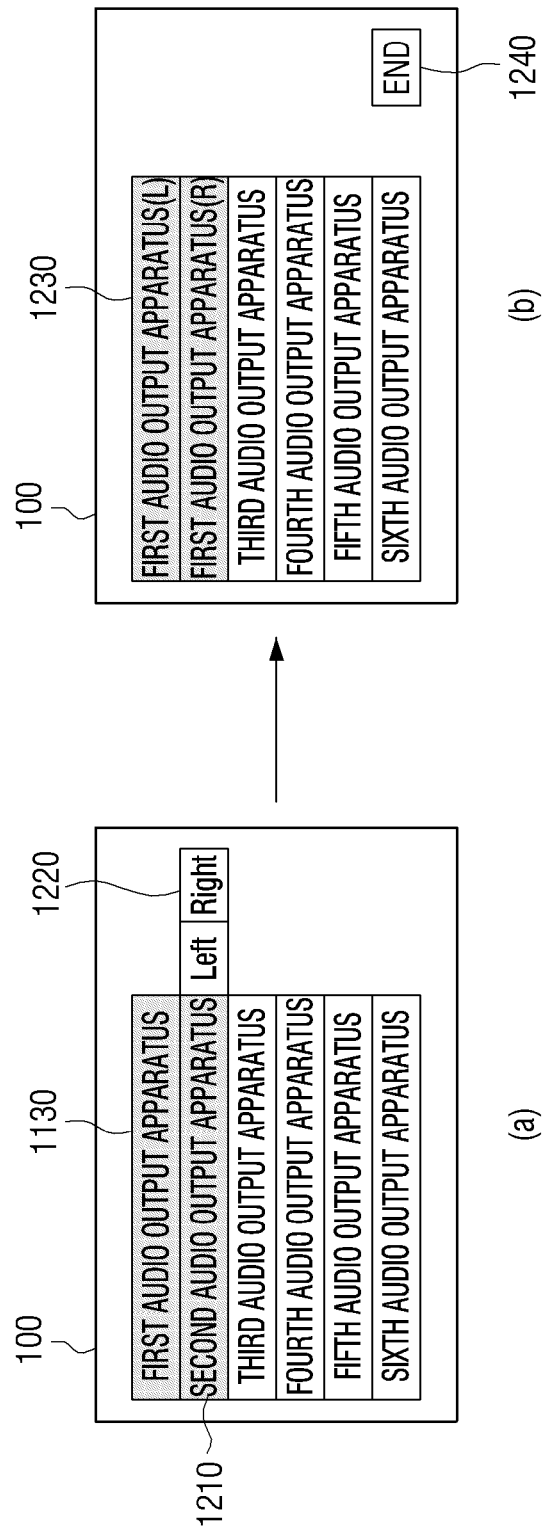
FIG. 12 is an exemplary view illustrating a completion of setting up a mode of an audio output apparatus in an electronic apparatus according to an exemplary embodiment.

FIG. 10 is an exemplary view illustrating setting up a mode of an audio output apparatus in an electronic apparatus according to another exemplary embodiment; FIG. 11 is an exemplary view illustrating setting up a channel of an audio output apparatus in an electronic apparatus according to an exemplary embodiment; and FIG. 12 is an exemplary view illustrating a completion of setting up a mode of an audio output apparatus in an electronic apparatus according to an exemplary embodiment.

As illustrated in (a) of FIG. 10, when an audio set up command is input by the user, the electronic apparatus 100 displays an audio set up proceeding UI 1010 that reads "Do you want to proceed with the user setting?(Yes (1030)/No (1040))". When "Yes" icon is selected with the audio set up proceeding UI 1010 displayed, as illustrated in (b) of FIG. 10, the electronic apparatus 100 displays a list UI 1020 that includes the preregistered first to sixth audio output apparatuses 200-1~200-6 on the screen.

When the list UI 1020 is displayed as aforementioned, the user may select the audio output apparatus to output an audio signal from the first to sixth audio output apparatuses 200-1~200-6 included in the list UI 1020. For example, as illustrated in (a) of FIG. 11, a command to select a first icon 1110 for the first audio output apparatus 200-1 may be input on the list UI 1020. When such a command to select the first icon 1110 is input, the electronic apparatus 100 displays a channel set up UI 1120 for setting up a channel of the first audio output apparatus 200-1 on an area where the first icon 1110 is displayed.

When a first icon that reads "Left" is selected with the channel set up UI 1120 displayed, the electronic apparatus 100 sets up the first audio output apparatus 200-1 to output an audio signal of L channel. When the mode setting for the first audio output apparatus 200-1 is completed, as illustrated in (b) of FIG. 11, the electronic apparatus 100 displays a mode set up list UI 1130. For example, the mode set up list UI 1130 may include highlight and channel information on a display area of the first audio output apparatus 200-1 set up to output an audio signal. Accordingly, the user may confirm that the first audio output apparatus 200-1 has been set up to a mode to outputting an audio signal of L channel.

Meanwhile, the user may further set up at least one audio output apparatus of the second to sixth audio output apparatuses 200-2~200-6 to output an audio signal.

Specifically, as illustrated in (b) of FIG. 11, with the mode set up list UI 1130 displayed, when a second icon 1210 for the second audio output apparatus 200-2 is selected, as illustrated in (a) of FIG. 12, the electronic apparatus 100 displays a channel set up UI 1220 for setting a channel of the second audio output apparatus 200-2 in an area where the second icon 1210 is displayed.

When a second icon that reads "Right" is selected with such a channel set up UI 1120 displayed, the electronic apparatus 100 sets up the second audio output apparatus 200-2 to output an audio signal of R channel. When the mode setting of the second audio output apparatus 200-2 is completed, the electronic apparatus 100 displays a mode set up list UI 1230 as illustrated in (b) of FIG. 12. Herein, the mode set up list UI 1230 may include highlight and channel information on a display area of the first and second audio output apparatuses 200-1, 200-2 set up to output an audio signal. Accordingly, the user may confirm that the first and second audio output apparatuses 200-1, 200-2 have been set up to a mode to output an audio signal of L channel and an audio signal of R channel through the mode set up list UI 1230.

As such, with the mode set up list UI 1230 displayed, when a command to end a mode is input, as illustrated at UI 1240, or when an additional command is not input within a predetermined marginal time, the electronic apparatus 100 may set up the first and second audio output apparatuses 200-1, 200-2 to output an audio signal of L channel and an audio signal of R channel, and set up the rest of the third to sixth audio output apparatuses 200-3~200-6 to output a noise removing signal.

However, there is no limitation thereto, and when a user command regarding at least one of the third to sixth audio output apparatuses 200-3~200-6 is input, the electronic apparatus 100 may set up the audio output apparatus corresponding to the user command input to output a noise removing signal.

Next, a method for controlling the electronic apparatus 100 configured to transmit a noise removing signal and audio signal from the plurality of audio output apparatuses 200 will be explained in detail.

Figure 13:
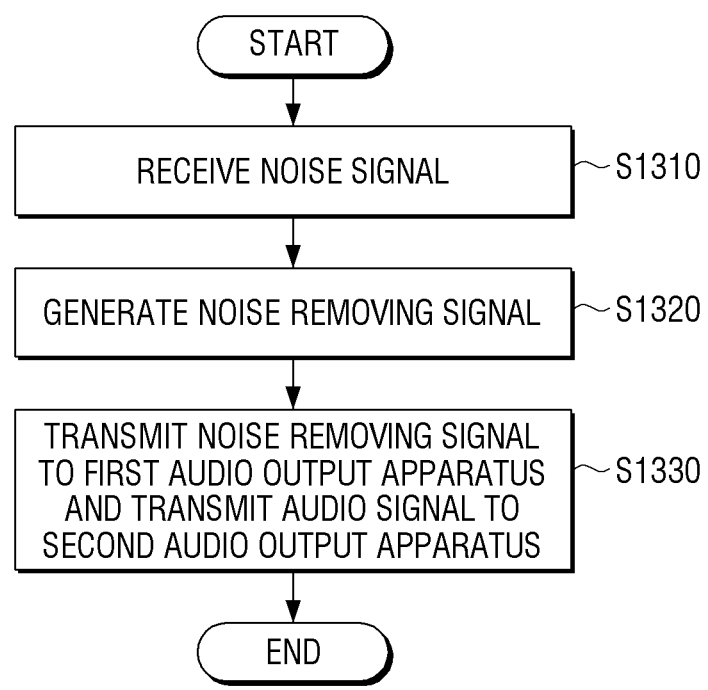
FIG. 13 is a flowchart illustrating a control method of an electronic apparatus according to an exemplary embodiment.

FIG. 13 is a flowchart schematically illustrating a control method of an electronic apparatus according to an exemplary embodiment;

As illustrated in FIG. 13, the electronic apparatus 100 receives a noise signal input into at least one first audio output apparatus 200-1 from among the plurality of audio output apparatuses 200 (S1310). Herein, the at least one first audio output apparatus 200-1 may be an apparatus set up to output a noise removing signal by the user.

As such, when the noise signal is received from the at least one first audio output apparatus 200-1, the electronic apparatus 100 generates a noise removing signal based on the received noise signal (S1320). According to an exemplary embodiment, when the noise signal is received from the at least one first audio output apparatus 200-1, the electronic apparatus 100 may perform phase inversion on the noise signal using a noise removing algorithm and generate a noise removing signal.

When such a noise removing signal is generated, the electronic apparatus 100 transmits the noise removing signal to the at least one first audio output apparatus 200-1 that transmitted the noise signal, and transmits an audio signal regarding the audio corresponding to the user's reproduce command to the rest of the second audio output apparatuses 200-2 of the plurality of audio output apparatuses 200 (S1330).

Accordingly, by outputting a noise removing signal towards the direction where the user is located, the first audio output apparatus 200-1 may attenuate the noise generated in the space where the user is located. Therefore, the user may hear the audio being output through the second audio output apparatus 200-2 in a listening environment where the noise is attenuated.

Figure 14:
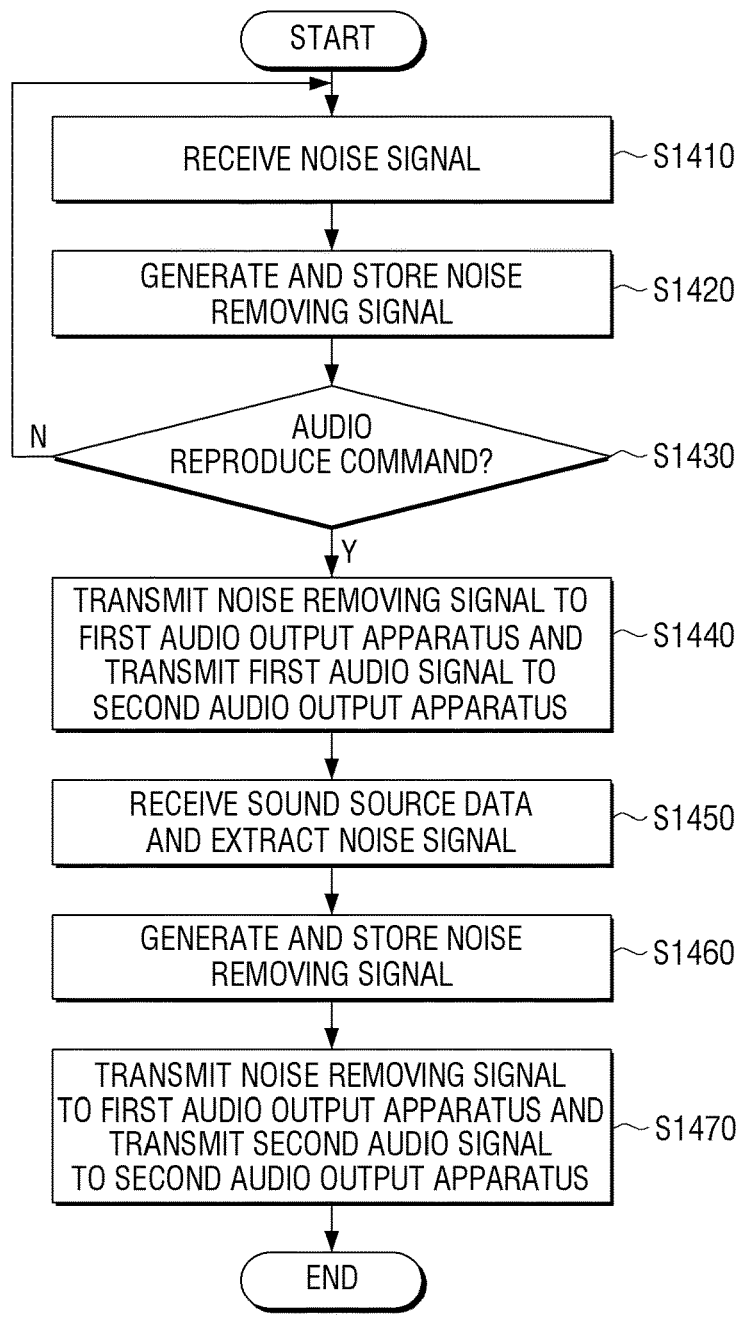
FIG. 14 is a flowchart illustrating in detail a control method of an electronic apparatus according to an exemplary embodiment.

FIG. 14 is a flowchart illustrating in detail a control method of an electronic apparatus according to an exemplary embodiment.

As illustrated in FIG. 14, the electronic apparatus 100 receives the noise signal input into the first audio output apparatus 200-1 set up to output a noise removing signal of the plurality of audio output apparatus 200 (S1410).

When the noise signal is received from the first audio output apparatus 200-1, the electronic apparatus 100 performs phase inversion on the received noise signal using the noise removing algorithm to generate the noise removing signal, and stores the generated noise removing signal (S1420). Herein, the electronic apparatus 100 may receive the noise signal periodically from the first audio output apparatus 200-1, in which case, the received noise signal may be updated to a generated noise removing signal and be stored.

As such, when an audio reproduce command is input by the user with the noise removing signal regarding the received noise signal updated and stored, the electronic apparatus 100 transmits the noise removing signal pre-stored in the plurality of audio output apparatuses 200 to the first audio output apparatus 200-1, and transmits an audio signal to the second audio output apparatus 200-2 according to the audio reproduce command (S1430, S1440). Herein, according to the audio reproduce command, when the first audio signal of the audio signals corresponding to the user's audio reproduce command is transmitted to the second audio output apparatus 200-2, the electronic apparatus 100 may temporarily store the first audio signal.

Meanwhile, the first output apparatus 200-1 signal-processes the noise removing signal received from the electronic apparatus 100 towards the direction where the user is located, and then outputs the signal-processed noise removing signal. Furthermore, the second audio output apparatus 200-2 may signal-process the first audio signal received from the electronic apparatus 100 towards the direction where the user is located, and output the signal-processed audio signal in an audible sound format. As such, when audio regarding the first audio signal is output from the second audio output apparatus 200-2, the first audio output apparatus 200-1 may receive sound source data that includes the noise signal generated in the surrounding environment of the first audio output apparatus 200-1 and the first audio signal regarding the audio output through the second audio output apparatus 200-2. When such sound source data is input, the first audio output apparatus 200-1 transmits the input sound source data to the electronic apparatus 100.

The electronic apparatus 100 that received the sound source data from the first audio output apparatus 200-1 extracts the noise signal from the sound source data based on the first audio signal (S1450). According to an exemplary embodiment, the electronic apparatus 100 separates a frequency component of the audio signal and a frequency component of the noise signal from the pre-received sound source data using the Fast Fourier Transformation (FFT).

When the noise signal is extracted from the sound source data through such a separating process, the electronic apparatus 100 generates a noise removing signal for removing the extracted noise signal, and updates it to a generated noise removing signal and stores the same (S1460). When the noise removing signal is generated, the electronic apparatus 100 transmits the noise removing signal to the first audio output apparatus 200-1 that transmitted the sound source data, and transmits a second audio signal of the audio signal that corresponds to the user's audio reproduce command to the second audio output apparatus 200-2 (S1470). That is, the electronic apparatus 100 may receive the sound source data that includes the noise signal from the first audio output apparatus 200-1 while the audio corresponding to the user's audio reproduce command is being output through the second audio output apparatus 200-1, in which case the aforementioned steps S1450 to S1470 may be repeatedly performed.

Meanwhile, at the aforementioned step S1460, the electronic apparatus 100 may determine whether a frequency band of the noise removing signal generated based on the noise signal extracted from the sound source data and a frequency band of the pre-stored noise removing signal are within a predetermined range. When it is determined that the frequency bands are outside the predetermined range, the electronic apparatus 100 may update the pre-stored noise removing signal to the noise removing signal generated based on the noise signal extracted from the sound source data, and store the updated noise removing signal.

Next, a method for setting up the audio output apparatus to output a noise removing signal of the plurality of audio output apparatuses 200 and setting up the audio output apparatus to output an audio signal of the plurality of audio output apparatuses 200, according to an audio set up command, will be described.

Figure 15:
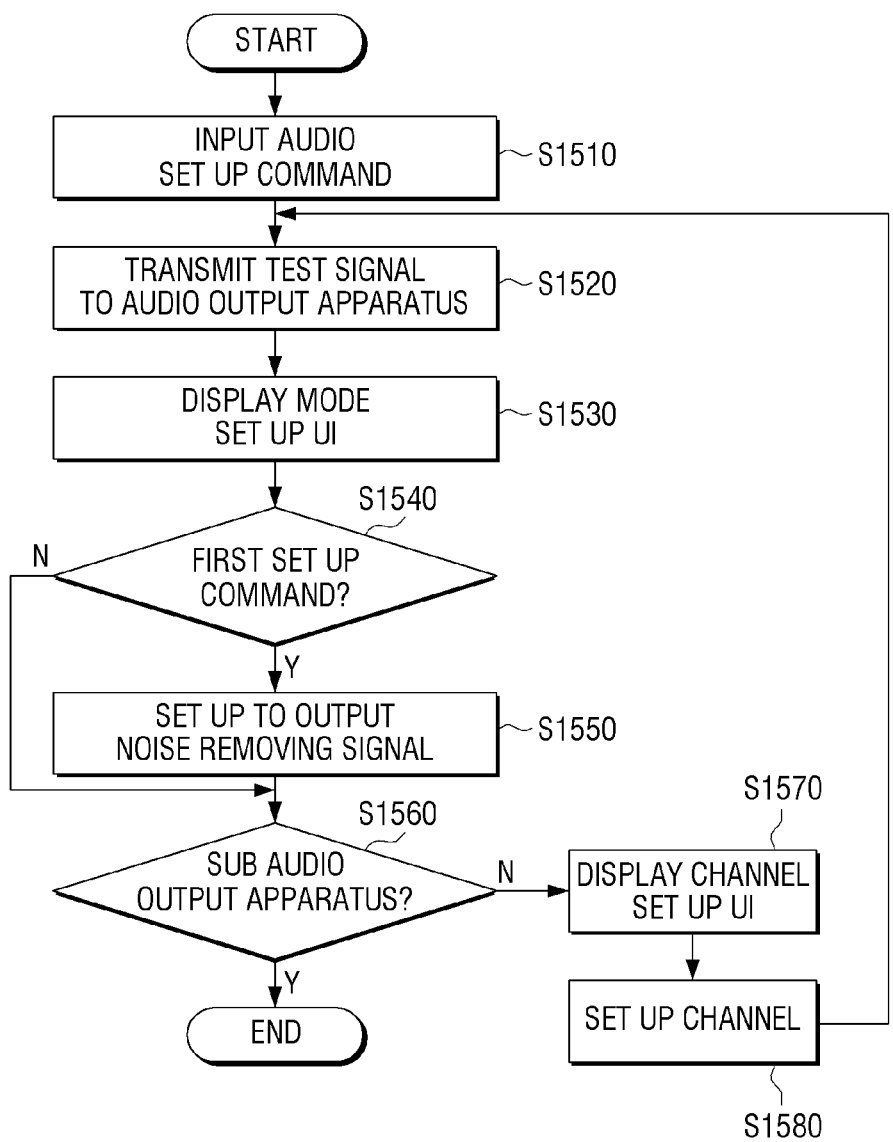
FIG. 15 is a flowchart illustrating setting up an operating mode of an audio outputting apparatus in an electronic apparatus according to an exemplary embodiment.

FIG. 15 is a flowchart illustrating setting up an operating mode of an audio outputting apparatus in an electronic apparatus according to an exemplary embodiment.

As illustrated in FIG. 15, when an audio set up command is input by the user, the electronic apparatus 100 transmits a test signal to the audio output apparatus (hereinafter referred to as first audio output apparatus 200-1 corresponding to the pre-defined order of the plurality of audio output apparatuses 200 (S1510, S1520). Accordingly, the first audio output apparatus 200-1 signal-processes the test signal received from the electronic apparatus 100 in an outputtable format and outputs the same. Meanwhile, when the test signal is output from the first audio output apparatus 200-1, the electronic apparatus 100 generates the mode set up UI regarding the first audio output apparatus 200-1 that output the test signal and displays the same (S1530). Herein, the mode set up UI may be a UI for setting up the first audio output apparatus 200-1 to output an audio signal or a noise removing signal.

When a first set up command is input by the user with such a mode set up UI displayed, the electronic apparatus 100 sets up the first audio output apparatus 200-1 that transmitted the test signal to output a noise removing signal (S1540, S1550). Meanwhile, when a second set up command is input by the user with the mode set up UI displayed, the electronic apparatus 100 determines whether the first audio output apparatus 200-1 that transmitted the test signal is an apparatus that outputs a sub audio (S1560).

When it is determined that the first audio output apparatus 200-1 is not an apparatus that outputs the sub audio, the electronic apparatus 100 generates a channel set up UI for setting up an audio output channel of the first audio output apparatus 200-1 and displays the same (S1570).

When a channel set up command regarding the first channel is input by the user with the channel set up UI displayed, the electronic apparatus 100 sets up the first audio output apparatus 200-1 that transmitted the test signal to output an audio signal of the first channel (S1580). Herein, the first channel may be L channel or R channel. That is, when the channel set up command regarding L channel is input by the user, the electronic apparatus 100 may set up the first audio output apparatus 200-1 that output the test signal to output an audio signal of L channel, and when the channel set up command regarding R channel is input, the electronic apparatus 100 sets up the first audio output apparatus 200-1 to output an audio signal of R channel.

When the mode setting regarding the first audio output channel 200-1 is completed, the electronic apparatus 100 repeats the aforementioned steps S1520 to S1550 to perform the mode setting regarding the second audio output apparatus 200-2 corresponding to the pre-defined order. Meanwhile, when the first audio output apparatus 200-1 or second audio output apparatus 200-2 is a sub audio output apparatus through the aforementioned step S1560, the electronic apparatus 100 ends the operation mode setting regarding the plurality of audio output apparatuses 200.

Figure 16:
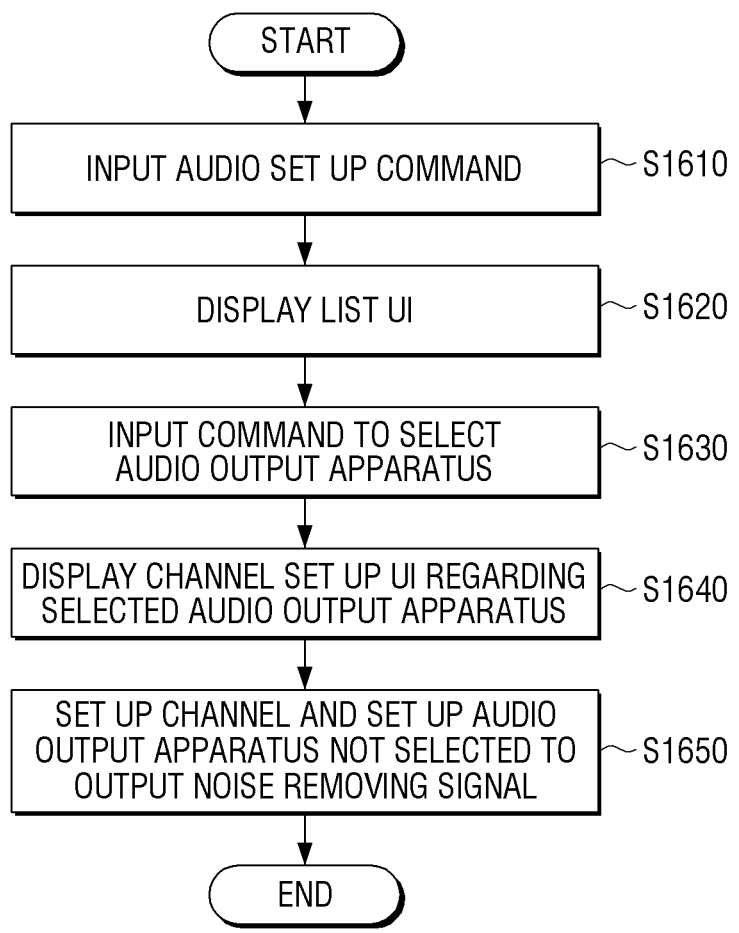
FIG. 16 is a flowchart illustrating setting up an operating mode of an audio outputting apparatus in an electronic apparatus according to another exemplary embodiment.

FIG. 16 is a second flowchart illustrating setting up an operating mode of an audio outputting apparatus in an electronic apparatus according to another exemplary embodiment.

As illustrated in FIG. 16, when an audio set up command is input by the user, the electronic apparatus 100 generates a list UI regarding the plurality of audio output apparatuses 200, and displays the same (S1610, S1620). When a command to select at least one audio output apparatus (hereinafter referred to as the first audio output apparatus 200-1) is input with the list UI displayed, the electronic apparatus 100 displays a channel set up UI for setting a channel of the first audio output apparatus 200-1 selected (S1630, S1640). Herein, the channel set up UI may be a UI for selecting a channel through which the audio signal may be output from the audio output apparatus 200-1 selected by the user.

When a channel set up command regarding the first channel is input with such a channel set up UI displayed, the electronic apparatus 100 sets up the first audio output apparatus 200-1 to output the audio signal of the first channel (S1650).

That is, when the channel set up command regarding L channel is input by the user, the electronic apparatus 100 sets up the first audio output apparatus 200-1 selected by the user to output the audio signal of L channel, and when the channel set up command regarding R channel is input, the electronic apparatus 100 sets up the first audio output apparatus 200-1 to output the audio signal of R channel.

Then, when a command to end a mode is input or when an additional command is not input by the user within a predetermined marginal time, the electronic apparatus 100 may set up the first audio output apparatus 200-1 of the plurality of audio output apparatuses 200 to output an audio signal and finally set up the rest of the audio output apparatuses to output a noise removing signal However, the disclosure is not limited thereto, and thus, when a user command regarding at least one audio output apparatus (hereinafter referred to as second audio output apparatus 200-2) of the rest of the audio output apparatuses is input, the electronic apparatus 100 may set up the second audio output apparatus 200-2 to output a noise removing signal and set up the first audio output apparatus 200-1 to output an audio signal of L channel or R channel.

Although one or more exemplary embodiments have been shown and described, it should be appreciated by those skilled in the art that changes may be made to exemplary embodiments without departing from the principles and spirit of the inventive concepts, the scope of which is defined in the claims and their equivalents.

What is claimed is:

1. A control method of an electronic apparatus, the method comprising:
receiving and storing a first noise signal from a first audio output apparatus from among a plurality of audio output apparatuses;
obtaining a noise removing signal based on the received first noise signal;
providing the noise removing signal to the first audio output apparatus, providing a first audio signal to a second audio output apparatus from among the plurality of audio output apparatuses, and storing the first audio signal;
receiving sound source data from the first audio output apparatus, the sound source data including the first audio signal which is outputted from the second audio output apparatus and a second noise signal;
in response to the sound source data being received, obtaining the second noise signal from the sound source data based on the stored first audio signal; and
refining the noise removing signal based on the first noise signal and the second noise signal.

2. The method of claim 1,
further comprising storing the noise removing signal,
wherein the providing the noise removing signal comprises, in response to an audio reproduce command being received, providing the noise removing signal to the first audio output apparatus and providing the first audio signal to the second audio output apparatus.

3. The method of claim 2, further comprising:
wherein the refining the noise removing signal further comprises updating the noise removing signal such that the noise removing signal is obtained based on the second noise signal obtained from the sound source data, and storing the updated noise removing signal.

4. The method of claim 3,
further comprising identifying whether a frequency band of the first noise signal and a frequency band of the second noise signal are within a predetermined range of each other,
wherein the refining the noise removing signal further comprises, in response to the frequency bands being outside of the predetermined range, updating the noise removing signal such that the noise removing signal is obtained based on the second noise signal obtained from the sound source data.

5. The method of claim 1,
further comprising, in response to receiving an audio set up command, setting up an audio output apparatus from among the plurality of audio output apparatuses to output the noise removing signal and setting up another audio output apparatus from among the plurality of audio output apparatuses to output an audio signal, according to the received audio set up command.

6. The method of claim 5,
wherein the setting up each of the plurality of audio output apparatuses comprises:
providing a test signal to an audio output apparatus from among the plurality of audio output apparatuses, corresponding to a pre-defined order of the plurality of audio output apparatuses;
displaying a mode set up user interface (UI) for the audio output apparatus that received the test signal and, in response, output the received test signal; and
in response to a first set up command being received while the mode set up UI is displayed, setting up the audio output apparatus that output the received test signal to output the noise removing signal, and in response to a second set up command being received, setting up the audio output apparatus that output the received test signal to output the audio signal.

7. The method of claim 6,
further comprising, in response to the second set up command being received, displaying a channel set up UI; and
in response to a channel set up command for a first channel being received while the channel set up UI is being displayed, setting up the audio output apparatus that output the received test signal to output an audio signal of the first channel,
wherein the first channel is a left channel or a right channel.

8. The method of claim 5,
wherein the setting up of an audio output apparatus comprises displaying a list UI for the plurality of audio output apparatuses according to the audio set up command; and
in response to a command to select at least one audio output apparatus being received while the list UI is displayed, setting up the at least one audio output apparatus selected to output the audio signal, and setting up the other audio output apparatuses from among the plurality of audio output apparatuses to output the noise removing signal.

9. The method of claim 8,
further comprising, in response to the command to select at least one audio output apparatus being received, displaying a channel set up UI; and
in response to a channel set up command for a first channel being received while the channel set up UI is displayed, setting up the at least one audio output apparatus to output an audio signal of the first channel,
wherein the first channel is a left channel or a right channel.

10. An electronic apparatus comprising:
a communicator configured to communicate with a first audio output apparatus from among a plurality of audio output apparatuses, and receive a first noise signal from the first audio output apparatus;
a signal processor configured to obtain a noise removing signal based on the received first noise signal; and
a controller configured to provide the noise removing signal to the first audio output apparatus, and to provide a first audio signal to a second audio output apparatus from among the plurality of audio output apparatuses; and
a storage configured to store the first noise signal and the first audio signal,
wherein the controller is further configured to:
control the communicator to receive sound source data from the first audio output apparatus, the sound source data including the first audio signal which is outputted from the second audio output apparatus and a second noise signal;

obtain, in response to the sound source data being received, the second noise signal from the sound source data based on the stored first audio signal; and refine the noise removing signal based on the first noise signal and the second noise signal.

11. The electronic apparatus according to claim 10, further comprising a storage configured to store the noise removing signal, wherein the controller is further configured to control the communicator to, in response to an audio reproduce command being received, provide the noise removing signal to the first audio output apparatus, and provide the first audio signal to the second audio output apparatus.

12. The electronic apparatus according to claim 11, wherein the controller is further configured to:

refine the noise removing signal such that the noise removing signal is based on the second noise signal, and store the refined noise removing signal in the storage.

13. The electronic apparatus according to claim 12, wherein the controller is further configured to identify whether a frequency band of the first noise signal and a frequency band of the second noise signal are within a predetermined range of each other, and in response to the frequency bands being outside of the predetermined range, refine the noise removing signal such that the noise removing signal is based on the second noise signal obtained from the sound source data.

14. The electronic apparatus according to claim 10, wherein the controller is further configured to set up an audio output apparatus from among the plurality of audio apparatuses to output the noise removing signal and set up another audio output apparatus from among the plurality of audio apparatuses to output an audio signal, according to an audio set up command.

15. The electronic apparatus according to claim 14, further comprising a display, wherein the controller is further configured to provide a test signal to an audio output apparatus corresponding to a pre-defined order of the plurality of audio output apparatuses, and display a mode set up user interface (UI) for the audio output apparatus that output the received test signal, and in response to a first set up command being received while the mode set up UI is displayed, set up the audio output apparatus that output the received test signal to output the noise removing signal, and in response to a second set up command being received, set up the audio output apparatus that received the test signal and, in response, output the received test signal to output the audio signal.

16. The electronic apparatus according to claim 15, wherein the controller is further configured to, in response to the second set up command being received, control the display to display a channel set up user interface (UI), in response to a channel set up command for a first channel being received while the channel set up UI is displayed, set up the audio output apparatus that output the received test signal to output an audio signal of the first channel, and wherein the first channel is a left channel or a right channel.

17. The electronic apparatus according to claim 14, further comprising a display, wherein the controller is further configured to control the display to display a list user interface (UI) for the plurality of audio output apparatuses according to the audio set up command, and in response to a command to select at least one audio output apparatus being received while the list UI is displayed, set up the at least one audio output apparatus selected to output an audio signal, and set up the other audio output apparatuses from among the plurality of audio output apparatuses to output a noise removing signal.

18. The electronic apparatus according to claim 17, wherein the controller is further configured to, in response to a command to select at least one audio output apparatus being received, control the display to display a channel set up UI, and in response to a channel set up command for a first channel being received while the channel set up UI is displayed, set up the at least one audio output apparatus to output an audio signal of the first channel, and wherein the first channel is a left channel or a right channel.

19. An audio output system comprising:
a plurality of audio output apparatuses; and
an electronic apparatus configured to:
in response to receiving a first noise signal from a first audio output apparatus from among the plurality of audio output apparatuses, store the first noise signal and obtain a noise removing signal based on the received first noise signal, and in response to an audio reproduce command being received, provide the noise removing signal to the first audio output apparatus, and provide an audio signal to a second audio output apparatus from among the plurality of audio output apparatuses, wherein the electronic apparatus comprises a storage configured to store the first audio signal, wherein the electronic apparatus is further configured to:
receive sound source data from the first audio output apparatus, the sound source data including the first audio signal which is outputted from the second audio output apparatus and a second noise signal;

obtain, in response to the sound source data being received, the second noise signal from the sound source data based on the stored first audio signal; and refine the noise removing signal based on the first noise signal and the second noise signal.

20. The audio output system according to claim 19, wherein the first audio output apparatus from among the plurality of audio output apparatuses is an apparatus set up to output the noise removing signal, and the second audio output apparatus is an apparatus set up to output an audio signal of a left channel or an audio signal of a right channel.

21. A method for reducing noise in an audio system, the method comprising:

displaying a list of a plurality of audio apparatuses that are within a predetermined range of an electronic device;

selecting, by touch input on the electronic device, a first audio apparatus from among the plurality of audio apparatuses;

receiving a first noise signal from the first audio apparatus, wherein the first noise signal corresponds to external sound in a vicinity of the first audio apparatus;

obtaining a noise removing signal based on the received first noise signal;

providing the noise removing signal to the first audio apparatus so that the first audio apparatus outputs the noise removing signal;
providing a first audio signal to a second audio output apparatus from among the plurality of audio apparatuses,
storing the first noise signal and the first audio signal;
receiving sound source data including the first audio signal which is outputted from the second audio output apparatus and a second noise signal;
in response to the sound source data being received, obtaining the second noise signal from the sound source data based on the stored first audio signal; and
refining the noise removing signal based on the first noise signal and the second noise signal.

* * * * *